US011708684B2

(12) United States Patent
Louis et al.

(10) Patent No.: US 11,708,684 B2
(45) Date of Patent: Jul. 25, 2023

(54) HYDRAULIC TANK

(71) Applicant: Caterpillar Inc., Peoria, IL (US)

(72) Inventors: Jared E. Louis, Monticello, IL (US); Bruno L. Risatti, Lemont, IL (US)

(73) Assignee: Caterpillar Inc., Peoria, IL (US)

( * ) Notice: Subject to any disclaimer, the term of this patent is extended or adjusted under 35 U.S.C. 154(b) by 837 days.

(21) Appl. No.: 16/676,243

(22) Filed: Nov. 6, 2019

(65) Prior Publication Data

US 2021/0131062 A1    May 6, 2021

(51) Int. Cl.

| E02F 9/08 | (2006.01) |
|---|---|
| F15B 21/042 | (2019.01) |
| F15B 21/044 | (2019.01) |
| F15B 1/26 | (2006.01) |
| B01D 19/00 | (2006.01) |
| F16N 39/00 | (2006.01) |
| B60K 15/077 | (2006.01) |

(52) U.S. Cl.
CPC ........ *E02F 9/0883* (2013.01); *B01D 19/0042* (2013.01); *F15B 1/26* (2013.01); *F15B 21/042* (2013.01); *F15B 21/044* (2013.01); *F16N 39/002* (2013.01); *B60K 2015/0777* (2013.01); *Y10T 137/86212* (2015.04)

(58) Field of Classification Search
CPC ........ F15B 1/26; F15B 21/044; F15B 21/042; Y10T 137/86212; Y10T 137/3003; Y10T 137/86204; E02F 9/0883; E02F 9/2264; B60P 1/162; B60P 1/283; B01D 19/0042; F16N 39/002; B60K 2015/0777

See application file for complete search history.

(56) References Cited

U.S. PATENT DOCUMENTS

| 5,202,026 | A | * | 4/1993 | Lema ................... B01D 50/20 55/459.1 |
|---|---|---|---|---|
| 8,491,707 | B2 | | 7/2013 | Knuth |
| 8,950,431 | B2 | | 2/2015 | Kim |
| 9,738,012 | B2 | | 8/2017 | Ulemek et al. |
| 9,797,418 | B2 | | 10/2017 | Hashimoto et al. |
| 2010/0219113 | A1 | | 9/2010 | Giarelli |
| 2015/0247511 | A1 | | 9/2015 | Barr et al. |

FOREIGN PATENT DOCUMENTS

| EP | 167252 A1 | 1/1986 |
|---|---|---|
| JP | 05-069401 U | 9/1993 |
| JP | 06-080902 U | 11/1994 |
| JP | 2005-282805 A | 10/2005 |
| JP | 2005282805 A * | 10/2005 |
| SE | 541197 C2 | 4/2019 |
| WO | 2011096397 | 8/2011 |
| WO | 2017082796 | 5/2017 |

OTHER PUBLICATIONS

International Search Report for international Patent Appln. No. PCT/US2020/059002, dated Feb. 3, 2021 (9 pgs).

* cited by examiner

*Primary Examiner* — Atif H Chaudry

(57) ABSTRACT

A hydraulic tank for a machine is disclosed herein. The hydraulic tank includes a casing defining an interior space and having an outer surface, an inner surface opposite the inner surface, and a return hydraulic fluid inlet extending through the casing. A first concave member is connected to the inner surface of the casing to form a passage. The passage is positioned and shaped to transport hydraulic fluid from the return hydraulic fluid inlet to another location within the hydraulic tank.

13 Claims, 4 Drawing Sheets

US 11,708,684 B2

HYDRAULIC TANK

TECHNICAL FIELD

The present disclosure generally pertains to machines, and is directed towards a hydraulic tank for a machine.

BACKGROUND

Many devices use fluid as a means to power other devices. For instance, many devices such as trucks, heavy equipment, construction equipment, farm equipment, etc. will utilize a hydraulic system that uses pressurized hydraulic fluid (typically oil) to run hydraulic motors, drive hydraulic cylinders, etc. Conventional equipment typically uses tubing to transport the hydraulic fluid from one location to another.

U.S. Pat. No. 8,491,707 to Knuth describes a fluid storage tank including an entrained air removal mechanism. The entrained air removal mechanism assists in consolidating small air bubbles entrained within the fluid into larger bubbles such that the air bubbles have sufficient buoyancy to escape the fluid flow. The entrained air removal mechanism may be in the form of a plurality of saw toothed slots communicating different chambers within the fluid storage tank. The fluid storage tank can also be configured to direct fluid flow towards the sidewalls of the fluid storage tank as the fluid transitions from one chamber to another to promote heat transfer out of the fluid storage tank and to avoid the fluid within the tank acting as a thermal insulator.

The present disclosure is directed toward improvements in the art.

SUMMARY

A hydraulic tank for a machine is disclosed herein. In embodiments, the hydraulic tank includes a casing defining an interior space. The casing having an outer surface, an inner surface opposite the outer surface, and a first return hydraulic fluid inlet extending through the casing. The hydraulic tank further includes a concave member having a first edge and a second edge opposite from the first edge. The concave member connects to the casing proximate the first edge and proximate the second edge. The concave member extends over the first return hydraulic fluid inlet. The concave member and the inner surface of the casing form a passage in fluid communication with the first return hydraulic fluid inlet.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. In some instances, well-known structures and components are shown in simplified form for brevity of description.

Figure 1:
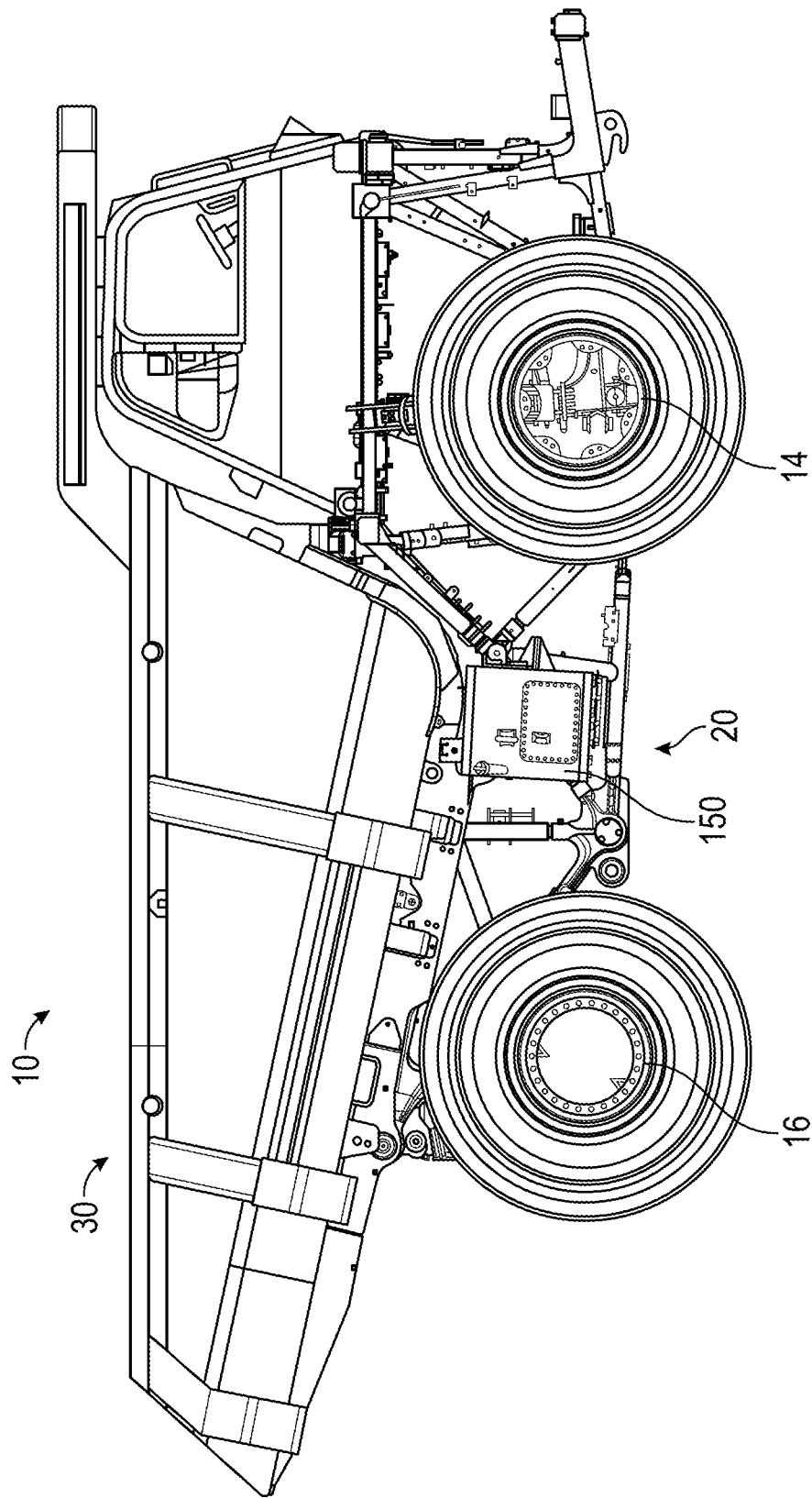
FIG. 1 is a side view of an exemplary machine.

FIG. 1 is a side view that illustrates an exemplary embodiment of a machine 10. Machine 10 may be a mobile machine that performs some type of operation associated with an industry such as mining, construction, or any other industry known in the art. For example, as shown in FIG. 1, machine 10 may be an earth moving machine, particularly, an off-highway rear haul truck.

Machine 10 may have a space frame 20 supported by front wheels 14 and rear wheels 16 (including respective tires). The front and rear wheels 14, 16 may be connected to space frame 20 by front suspension members and rear suspension systems, respectively. Machine 10 may also include a bed or body 30 supported by the space frame 20. Such bed or body 30 may be referred to herein as a dump body 30. The machine 10 can include a hydraulic tank 150 which can be provided at one side of the machine 10. The hydraulic tank 150 is configured to store and/or process hydraulic fluid (typically oil) for the machine 10. The hydraulic tank 150 can be coupled to the space frame 20.

In general, a space frame according to embodiments of the disclosed subject matter, such as space frame 20, may be a frame that includes structural members connected to each other at nodes and/or joints. The structural members can include hollow tubes and/or solid tubes. The structural members can be made of metal, metal alloys, or reinforced composite materials, for instance.

Figure 2:
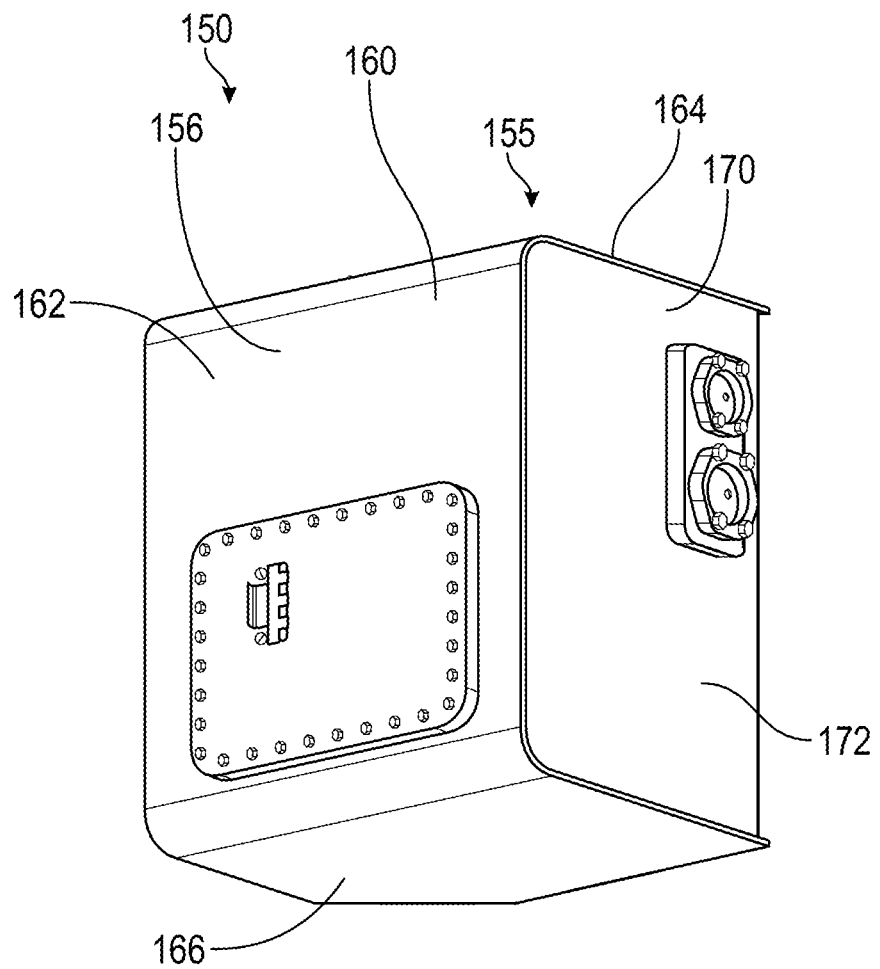
FIG. 2 is a perspective view of the front side of the hydraulic tank from FIG. 1.

FIG. 2 is a perspective view of the front side of the hydraulic tank 150 from FIG. 1. The hydraulic tank 150 can include a casing 155 that defines an interior space. The casing 155 can have an outer surface 156 and may include a first piece 160 and a second piece 170. In an embodiment the first piece 160 can be positioned with the second piece 170 to form the casing 155 and the outer surface 156.

In an embodiment the first piece 160 can be generally U shaped and have three sides. The first piece 160 can include a front side 162, a top side 164, and a bottom side 166. The top side 164 can be positioned opposite from the bottom side 166. The front side 162 can extend from the top side 164 to the bottom side 166.

The second piece 170 can include a second side 172 that can be positioned adjacent to the front side 162, the top side 164, and the bottom side 166.

Figure 3:
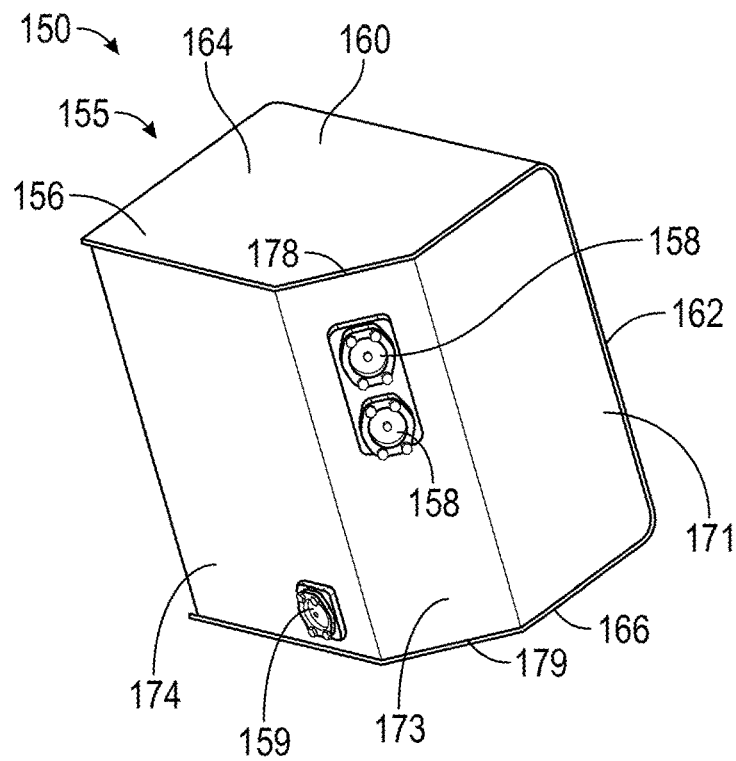
FIG. 3 is a perspective view of the back side of the hydraulic tank from FIG. 1.

FIG. 3 is a perspective view of the back side of the hydraulic tank 150 from FIG. 1. Where the drawing includes multiple instances of the same feature, for example first return hydraulic fluid inlet 158, the reference number is only shown in connection with one instance of the feature to improve the clarity and readability of the drawing. This also true in other drawings which include multiple instances of the same feature.

The second piece 170 can include a top end 178 and a bottom end 179 located opposite from the top end 178. In an embodiment the top end 178 can be located adjacent to the top side 164. In an embodiment the bottom end 179 can be located adjacent to the bottom side 166.

The second piece 170 of the hydraulic tank 150 can include a first side 171, the second side 172 (shown in FIG. 2), a third side 173, and a back side 174. The first side 171 can be positioned opposite of the second side 172. The first side 171 can be positioned adjacent to the front side 162, the top side 164, and the bottom side 166. The back side 174 can be positioned opposite from the front side 162. The back side 174 can extend from the second side 172 to the third side 173. The back side 174 can be positioned adjacent to the top side 164 and the bottom side 166. The third side 173 can extend from the first side 171 to the back side 174. The third side 173 can be positioned adjacent to the top side 164 and the bottom side 166. The third side 173 can include a first return hydraulic fluid inlet 158 (sometimes referred to as return hydraulic fluid inlet) extending through the third side 173. In an embodiment there are multiple first return hydraulic fluid inlets 158. The first return hydraulic fluid inlet 158 can be located proximate to the top end 178.

The back side 174 can include a second return hydraulic fluid inlet 159 (sometimes referred to as return hydraulic fluid inlet) extending through the back side 174. The second return hydraulic fluid inlet 159 can be spaced apart from the first return hydraulic fluid inlet 158 and located proximate to the bottom end 179. In an embodiment the second return hydraulic fluid inlet 159 is proximate the third side 173.

Figure 4:
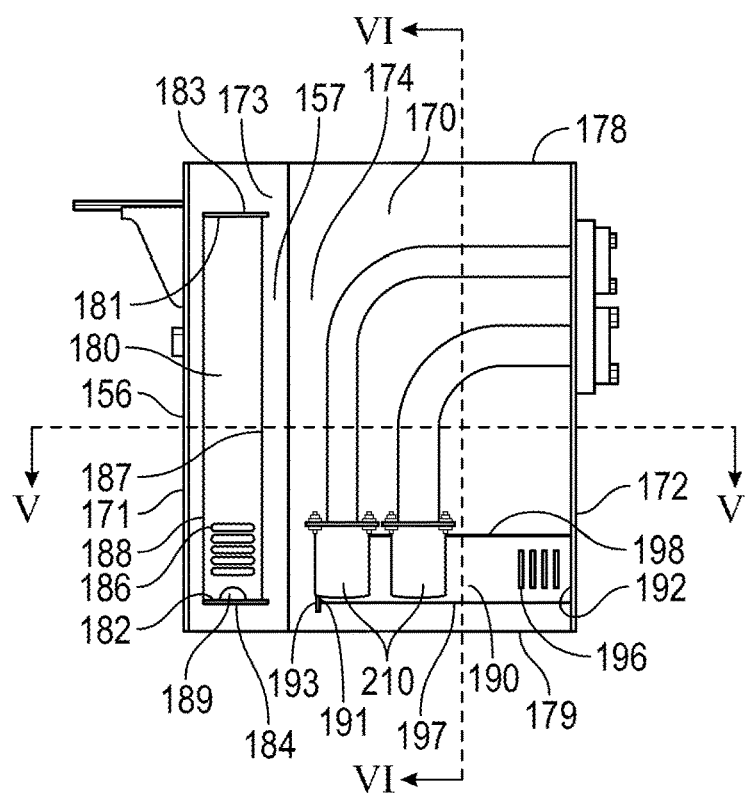
FIG. 4 is a side view of the hydraulic tank from FIG. 1 with the first piece of the casing removed.

FIG. 4 is a side view of the hydraulic tank from FIG. 1 with the first piece of the casing removed. The second piece 170 can form a portion of the inner surface 157 of the casing 155. The hydraulic tank 150 can include a first concave member 180 (sometimes referred to as concave member) positioned adjacent to the inner surface 157 of the casing 155. In an embodiment the concave member 180 can be connected to the inner surface 157 along the third side 173. The first concave member 180 can have a first concave member inlet end 181 and a first concave member outlet end 182 opposite from the first concave member inlet end 181. The first concave member inlet end 181 can be located proximate to the first return hydraulic fluid inlet 158 (shown on FIG. 3). The first concave member 180 can include a first concave member opening 186 (sometimes referred to as concave member opening) proximate to the first concave member outlet end 182. In an embodiment there are multiple first concave member openings 186. In an embodiment the first concave member openings 186 are stadium shaped. In other examples the first concave member openings 186 are other shapes and can be circular, rectangular, triangular, elliptical, linear, or a variety of curves and linear segments.

The first concave member 180 can include a first concave member first edge 187 (sometimes referred to as first edge) and a first concave member second edge 188 (sometimes referred to as second edge) opposite from the first concave member first edge 187. In an embodiment the first concave member 180 is connected to the inner surface 157 of the casing 155 proximate the first concave member first edge 187 and proximate the first concave member second edge 188. The first concave member first edge 187 can be generally parallel with the first concave member second edge 188. The first concave member first edge 187 can extend from the first concave member inlet end 181 to the first concave member outlet end 182. The first concave member second edge 188 can extend from the first concave member inlet end 181 to the first concave member outlet end 182.

The hydraulic tank 150 can include a first concave member top cap 183 and a first concave member bottom cap 184 opposite from the first concave member top cap 183. The first concave member top cap 183 can be located at the first concave member inlet end 181. The first concave member top cap 183 can be connected to the first concave member 180. The first concave member top cap 183 can be connected to the inner surface 157 of the casing 155. The first concave member bottom cap 184 can be located at to the first concave member outlet end 182. The first concave member bottom cap 184 can be connected to the first concave member 180. The first concave member bottom cap 184 can be connected to the inner surface 157 of the casing 155.

The first concave member 180 can include a first concave member clean out 189 located adjacent to the first concave member outlet end 182. The first concave member clean out 189 is an opening in the first concave member which can be formed between the first concave member 180 and the first concave member bottom cap 184. In an embodiment the first concave member clean out 189 has a semi-circle shape. In other examples the first concave member clean out 189 is other shapes and can be circular, rectangular, triangular, elliptical, liner, or a variety of curves and linear segments.

The hydraulic tank 150 can include a second concave member 190 (sometimes referred to as concave member) positioned adjacent to the inner surface 157 of the casing 155. In an embodiment the concave member 180 can be connected to the inner surface 157 along the back side 174. The second concave member 190 can have a second concave member inlet end 191 and a second concave member outlet end 192 opposite from the second concave member inlet end 191. The second concave member inlet end 191 can be located proximate to the second return hydraulic fluid inlet 159 (shown on FIG. 3). The second concave member outlet end 192 can be connected the second side 172. The second concave member 190 can include a second concave member opening 196 (sometimes referred to as concave member opening) proximate to the second concave member outlet end 192. In an embodiment there are multiple second concave member openings 196. In an embodiment the second concave member openings 196 are stadium shaped. In other examples the second concave member openings 196 are other shapes and can be circular, rectangular, triangular, elliptical, liner, or a variety of curves and linear segments.

The second concave member 190 can include a second concave member first edge 197 (sometimes referred to as first edge) and a second concave member second edge 198 (sometimes referred to as second edge) opposite from the second concave member first edge 197. In an embodiment the second concave member 190 is connected to the inner surface 157 of the casing 155 proximate the second concave member first edge 197 and proximate the second concave member second edge 198. The second concave member first edge 197 can be generally parallel with the second concave member second edge 198. The second concave member first edge 197 can extend from the second concave member inlet end 191 to the second concave member outlet end 192. The second concave member second edge 198 can extend from the second concave member inlet end 191 to the second concave member outlet end 192.

The hydraulic tank 150 can include a second concave member cap 193. The second concave member cap 193 can be located adjacent to the second concave member inlet end 191. The second concave member cap 193 can be connected to the second concave member 190. The second concave member cap 193 can be connected to the inner surface 157 of the casing 155.

The hydraulic tank 150 can include hydraulic fluid intake passages 210. In an embodiment the hydraulic fluid intake passages 210 extend from the second side 172 to approximately the middle between the first side 171 and the second side. The hydraulic fluid intake passages 210 can be a conduit to transport hydraulic fluid from within the hydraulic tank 150 to outside the hydraulic tank 150.

Figure 5:
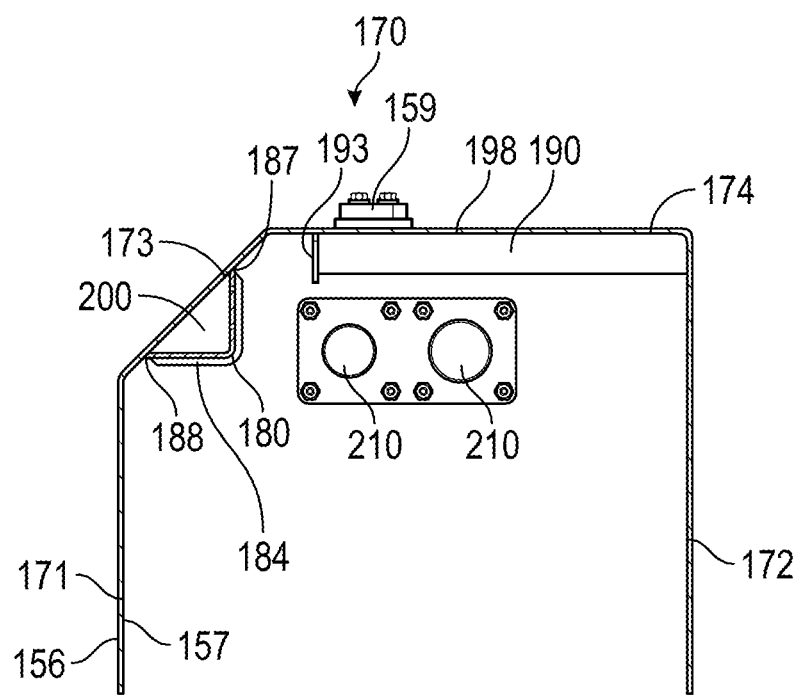
FIG. 5 is a cross-section of the hydraulic tank along line V-V from FIG. 4.

FIG. 5 is a cross-section of the hydraulic tank along line V-V from FIG. 4. The first concave member 180 and the inner surface 157 can form a first passage 200 (sometimes referred to as passage or flow path). The first concave member 190, the inner surface 157, the first concave member top cap 183, and the first concave member bottom cap 184 can define a first passage 200 that is closed and can receive hydraulic fluid from the first return hydraulic fluid inlets 158 and transport the hydraulic fluid to the first concave member openings 186. In an embodiment the first passage 200 is adjacent and along the third side 173. The first passage 200 can extend from the first concave member inlet end 181 (shown on FIG. 4) to the first concave member outlet end 182 (shown on FIG. 4). The first passage 200 can be in fluid communication with the first return hydraulic fluid inlet 158 (shown on FIG. 3). In an embodiment, the first concave member 180 can have an L shaped cross-section, sometimes referred to as a structural angle. In other examples the first concave member 180 has a different cross-sectional shape such as a U shape, C shape, V shape, curved plate, or other combinations of straight and/or curved shapes. In an example the first concave member 180 is straight such as a flat plate and the inner surface 157 has a concave shape such as a corner formed by the third side 173 and the back side 174.

In an embodiment the hydraulic fluid intake passages 210 are located proximate to the back side 174. In an embodiment the hydraulic fluid intake passages 210 are approximately equidistant from the first side 171 and the second side 172.

Figure 6:
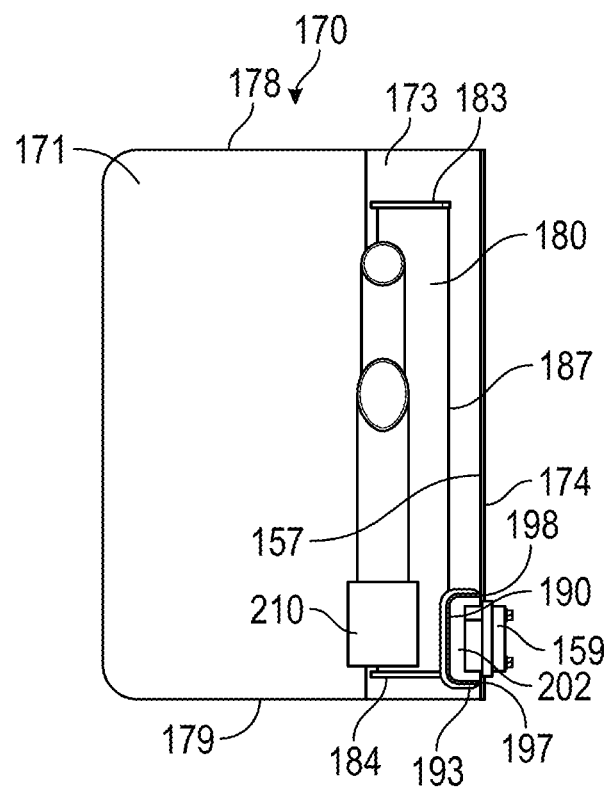
FIG. 6 is a cross-section of the hydraulic tank along line VI-VI from FIG. 4.

FIG. 6 is a cross-section of the hydraulic tank along line VI-VI from FIG. 4. The second concave member 190 and the inner surface 157 can form a second passage 202 (sometimes referred to as passage or flow path). In an embodiment the second passage 202 is adjacent and along the back side 174. The second passage 202 can extend from the second concave member inlet end 191 (shown on FIG. 4) to the second concave member outlet end 192 (shown on FIG. 4). The second passage 202 can be in fluid communication with the second return hydraulic fluid inlet 159 (shown on FIG. 3). In an embodiment, the second concave member 190 can have an U shaped cross-section, sometimes referred to as a structural channel. In other examples the second concave member 190 has a different cross-sectional shape such as a C shape, V shape, L shape, straight plate, curved plate, or other combinations of straight and/or curved shapes.

INDUSTRIAL APPLICABILITY

Embodiments of the present disclosure relate to hydraulic tanks for machines 10 such as haul trucks, and systems, components, and methods thereof. Conventional tanks can include tubing to transport hydraulic fluid from one location to another. In an example, tubing can isolate the hydraulic fluid from air to prevent aeration of the hydraulic fluid. However tubing can be expensive and require special fittings to install.

In the disclosed embodiments a concave member 180, 190 can be mounted to the inner surface 157 of the hydraulic tank 150 to define a flow path for transporting hydraulic fluid to a desired location and can be more cost efficient than the use of tubing. In an embodiment the flow path extends from the return hydraulic fluid inlet 158, 159 to the concave member opening 186, 196. The passage 200,202 can transport hydraulic fluid entering from the return hydraulic fluid inlet 158, 159 to a specific desired area within the hydraulic tank 150. In an example the hydraulic tank 150 has a level of hydraulic fluid and the desired area is located below the surface of hydraulic fluid. In another example the desired area is spaced from the hydraulic fluid intake passages 210. The concave member opening 186,196 can be shaped and oriented to direct hydraulic fluid out of the passage 200, 202 and away from the hydraulic fluid intake passages 210 where hydraulic fluid is being removed and transported outside of the hydraulic tank 150. In examples the concave member 180, 190, can provide additional structural support to the hydraulic tank 150.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art.

What is claimed is:

1. A hydraulic tank for a machine, the hydraulic tank comprising:
    a casing defining an interior space, the casing having
        an outer surface,
        an inner surface opposite the outer surface, and
        a first return hydraulic fluid inlet extending through the casing; and
        one or more fluid intake passages,
        a top end proximate the first return hydraulic fluid inlet, and
        a bottom end opposite the top end, wherein the first concave member extends from proximate the first return hydraulic fluid inlet to proximate the bottom end;
    a first concave member adjacent to the inner surface of the casing, the first concave member and the inner surface of the casing defining a first passage in fluid communication with the first return hydraulic fluid inlet, the first concave member having
        a first concave member inlet end proximate to the first return hydraulic fluid inlet,
        a first concave member outlet end opposite from the first concave member inlet end, and
        a first concave member opening proximate to the first concave member outlet end; and
        a first concave member bottom cap attached to the first concave member at the first concave member outlet end forming the end of the first passage, wherein the first concave member has an L shaped cross-section and the first concave member opening is located on a side of the first concave member facing away from the one or more fluid intake passages.

2. The hydraulic tank of claim 1, wherein the casing further includes
    a second return hydraulic fluid inlet spaced from the first return hydraulic fluid inlet extending through the casing; and
    wherein the hydraulic tank further includes
    a second concave member adjacent to the inner surface of the casing, the second concave member and the inner surface of the casing forming a second passage in fluid communication with the second return hydraulic fluid inlet, the second concave member having a second concave member inlet end proximate to the second return hydraulic fluid inlet and proximate the bottom end, a second concave member outlet end opposite from the second concave member inlet end and proximate the bottom end, and a second concave member opening proximate to the second concave member outlet end.

3. The hydraulic tank of claim 2, wherein the second concave member extends from proximate the second return hydraulic fluid inlet away from the first concave member.

4. The hydraulic tank of claim 3, wherein the second concave member has a U-shaped cross-section.

5. A hydraulic tank for a machine, the hydraulic tank comprising:
a casing defining an interior space, the casing having
an outer surface,
an inner surface opposite the outer surface,
one or more fluid intake passages, and
a first return hydraulic fluid inlet extending through the casing;
a concave member having a first edge, a second edge opposite from the first edge, an outlet end and an opening through the concave member proximate the outlet end on a portion of the concave member facing away from the one or more fluid intake passages, the concave member connected to the casing proximate the first edge and proximate the second edge, the concave member extending over the first return hydraulic fluid inlet, the concave member and the inner surface of the casing forming a passage in fluid communication with the first return hydraulic fluid inlet; and
a bottom cap attached to the concave member at the member outlet end forming the end of the passage.

6. The hydraulic tank of claim 5, wherein the casing further includes
a top end proximate the first return hydraulic fluid inlet, and
a bottom end opposite the top end; and
wherein the concave member extends from proximate the first return hydraulic fluid inlet to proximate the bottom end.

7. The hydraulic tank of claim 5, wherein the concave member has an L shaped cross-section.

8. The hydraulic tank of claim 5, wherein the concave member has a U-shaped cross-section.

9. The hydraulic tank of claim 5, wherein the first edge and the second edge are generally parallel to each other.

10. A hydraulic tank for a machine, the hydraulic tank comprising:
a casing defining an interior space, the casing having
an outer surface,
an inner surface opposite the outer surface,
one or more fluid intake passages, and
a return hydraulic fluid inlet extending through the casing;
a concave member having an outlet end and a concave member opening opposite from the return hydraulic fluid inlet and proximate the outlet end on a portion of the concave member facing away from the one or more fluid intake passages, the concave member connected with the inner surface thereby defining a flow path extending from the return hydraulic fluid inlet to the concave member opening;
a bottom cap attached to the concave member at the outlet end.

11. The hydraulic tank of claim 10, wherein the casing further includes
a top end proximate the first return hydraulic fluid inlet, and
a bottom end opposite the top end; and
wherein the concave member extends from proximate the return hydraulic fluid inlet to proximate the bottom end.

12. The hydraulic tank of claim 10, wherein the concave member has an L shaped cross-section.

13. The hydraulic tank of claim 10, wherein the concave member has a U-shaped cross-section.

* * * * *